(12) United States Patent
Maturi et al.

(10) Patent No.: US 7,587,513 B1
(45) Date of Patent: Sep. 8, 2009

(54) EFFICIENT STORAGE OF NETWORK AND APPLICATION DATA

(75) Inventors: Mohan Maturi, San Jose, CA (US); Amit Maheshwari, Bangalore (IN)

(73) Assignee: Network General Technology, George Town, Grand Cayman (KY)

( * ) Notice: Subject to any disclaimer, the term of this patent is extended or adjusted under 35 U.S.C. 154(b) by 454 days.

(21) Appl. No.: 11/489,915

(22) Filed: Jul. 19, 2006

(51) Int. Cl.
*G06F 15/16* (2006.01)
*G06F 15/173* (2006.01)
*G06F 7/00* (2006.01)

(52) U.S. Cl. .................. 709/234; 709/224; 709/232; 707/102

(58) Field of Classification Search .................. None
See application file for complete search history.

(56) References Cited

U.S. PATENT DOCUMENTS 5,923,654 A * 7/1999 Schnell .................. 370/390
6,421,676 B1 * 7/2002 Krishnamurthy et al. ..... 707/102
6,751,663 B1 * 6/2004 Farrell et al. ................ 709/224
7,353,360 B1 * 4/2008 Muller et al. ............... 711/203
2005/0283567 A1 * 12/2005 Popescu-Stanesti et al. . 711/106

* cited by examiner

*Primary Examiner*—Wen-Tai Lin
(74) *Attorney, Agent, or Firm*—Fenwick & West LLP

(57) ABSTRACT

Network data is stored and retrieved from a network data repository configured for rapid data access and efficient usage of storage space. The network data repository includes a plurality of flow record folders. A flow record folder includes a location index and one or more circular buffers of record tables, each circular buffer corresponding to network data collected from a particular location. Network data is aggregated with more or less detail in different flow record folders, and network data in different flow record folders is retained for varying amounts of time.

28 Claims, 12 Drawing Sheets

| Flow Record Folder | 306A | 306B | 306C |
|---|---|---|---|
| Table Size 1004 | Day | Week | Month |
| Location 1006 | | | → |
| Client 1008 | → | | |
| Server 1010 | | | → |
| | → Server Filter | | |
| Application 1012 | | | → |
| Client Subnet 1014 | | | → |
| Time Stamp 1016 | 15 Seconds | 15 Minutes | 1 Hour |
| Measures 1018 | | | → |

FIG. 10

EFFICIENT STORAGE OF NETWORK AND APPLICATION DATA

BACKGROUND OF THE INVENTION

1. Field of the Invention

The present invention relates to network data management and, more specifically, to a system and method for efficiently storing and retrieving network and application data.

2. Description of the Related Art

Today's computer networks are extremely complex, with hundreds or more of applications, thousands or more of servers, hundreds or more of locations, hundreds of thousands of clients, and network traffic routed by numerous switches and routers on the computer networks. Network and application data collected from various parts of the network can provide insight into network conditions, but the enormous amount of data present a challenge for data storage, processing, and retrieval.

Conventional data storage systems allow for the storage and retrieval of data. However, storage and access times of conventional systems suffer greatly as the amount of data stored is increased. Presently available systems are inadequate for failing to store data in a manner such that it can be rapidly retrieved for network analysis. Furthermore, because data is stored inefficiently, an insufficient amount of network data is retained for future analysis.

Therefore, there is a need for a technique for efficiently storing and retrieving network data collected from a network.

SUMMARY OF THE INVENTION

Embodiments of the present invention include a method and a computer program product for efficiently storing data collected from a network.

Network data is received from locations on the network as flow entries. A flow entry includes network data collected at a specific location and during a specific period of time. The network data of the flow entry is stored as a first flow record in a first flow record folder. The first flow record folder includes a plurality of circular buffers of record tables, and a location index mapping locations to specific circular buffers. The location index is used to determine the circular buffer of record tables in which the network data of the flow entry is to be stored.

The period of time during which the network data was collected is used to determine a particular record table in the circular buffer of record tables. The network data is stored as a flow record in the determined record table.

Using the various features and principles of the present invention described herein, network data can be efficiently stored and rapidly retrieved in a network data repository.

According to one embodiment of the present invention, the method further includes aggregating multiple flow entries collected within a common time unit and storing the combined measures as a second flow record in a second flow record folder.

According to one embodiment of the present invention, a time stamp and location of a flow record are stored as a 32 bit block ID.

According to one embodiment of the present invention, an IP address or IP subnet address is stored as a 32 bit signed integer.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 10 illustrates the organization of network data in various flow record folders, according to one embodiment of the present invention.

DETAILED DESCRIPTION OF EMBODIMENTS

The Figures (Fig.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
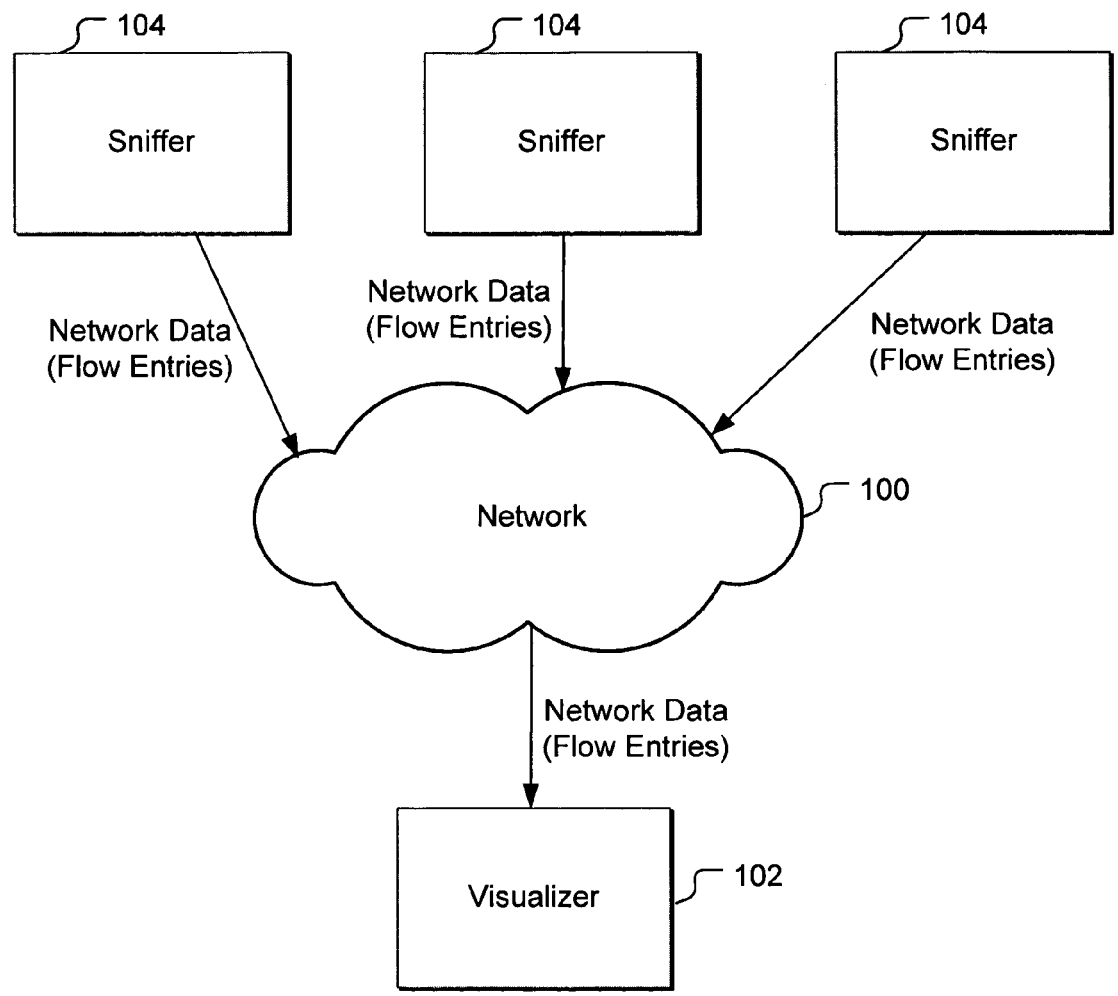
FIG. 1 illustrates a system architecture for collecting network data from a network, according to one embodiment of the present invention.

FIG. 1 illustrates the system architecture for a visualizer storing or retrieving network data collected from a network, according to one embodiment of the present invention. As shown in FIG. 1, a number of network sniffer devices 104 are deployed in various nodes of the network 100 collecting network data. The network data typically include application intelligence data and RMON (Remote Monitoring of Networks) data. Network data is typically comprised of a series of flow entries (network activity from a specific source) including a variety of keys (time stamp, location, application, client, server, etc.) and a variety of measures (number of bytes, number of packets, response times, etc.).

The network data (flow entries) collected by the sniffer devices 104 are provided to the visualizer 102. The sniffer devices 104 may provide raw network data to the visualizer 102, or may pre-process the network data in a form more convenient for processing by the visualizer 102. The visualizer 102 includes an electronic storage medium with a network data repository for storing the network data contained in the flow entries. Thus, network data can be stored and retrieved on the visualizer 102. Note that the network data may be provided to the visualizer 102 from sources other than the sniffer devices 104, although in FIG. 1 only the sniffers 104 are illustrated as providing the network data to the visualizer 102.

Figure 2:
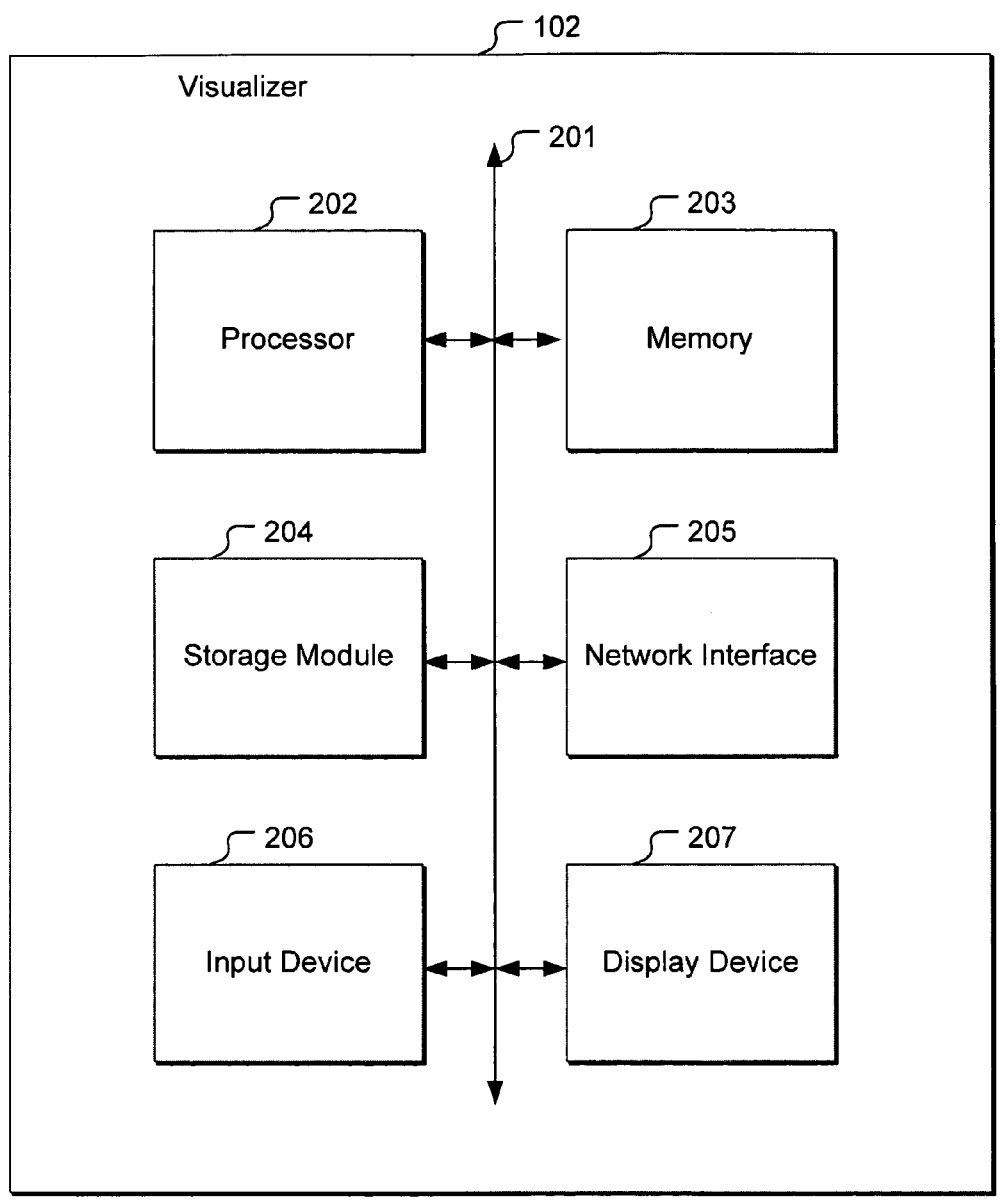
FIG. 2 illustrates the components of the visualizer, according to one embodiment of the present invention.

FIG. 2 illustrates the components of the visualizer 102, according to one embodiment of the present invention. The visualizer 102 can be, for example, a server computer running software for providing the functionalities of the visualizer 102 in accordance with the present invention. In one embodiment, the visualizer 102 includes a processor 202, a memory 203, a storage module (e.g., hard disk drive) 204, an input device (e.g., keyboard, mouse, and the like) 206, a display device 207, and a network interface 205, exchanging data with one another through a bus 201.

The network interface 205 may include a NIC (network interface card) or other standard network interfaces to communicate with other network interface devices coupled to the network 100. For example, the network interface 205 may be an Ethernet interface, a WiFi (IEEE 802.11) interface, or other types of wired or wireless network interfaces. The visualizer 102 receives network data (records) from the sniffers 104 over the network 100 through the network interface 205.

The memory 203 stores software for organizing, storing and/or retrieving network data. Methods for organizing and storing network data are described herein with reference to FIGS. 7-9. The storage module 204 stores the network data repository, which is described herein with reference to FIGS. 3-6. The memory 203 and storage module 204 have been shown as distinct for the purposes of illustration, but according to one embodiment of the present invention, they may reside on the same storage medium. According to one embodiment of the present invention, the memory 203 or the storage module 204 can also be located remotely from the other components of the host computer 102, for example, at a remote network location.

The display device 207 can be a standard liquid crystal display or any other types of display devices, and can display various network statistics. Note that not all components of the visualizer 102 are shown in FIG. 2 and that certain components not necessary for illustration of the present invention are omitted herein.

Figure 3:
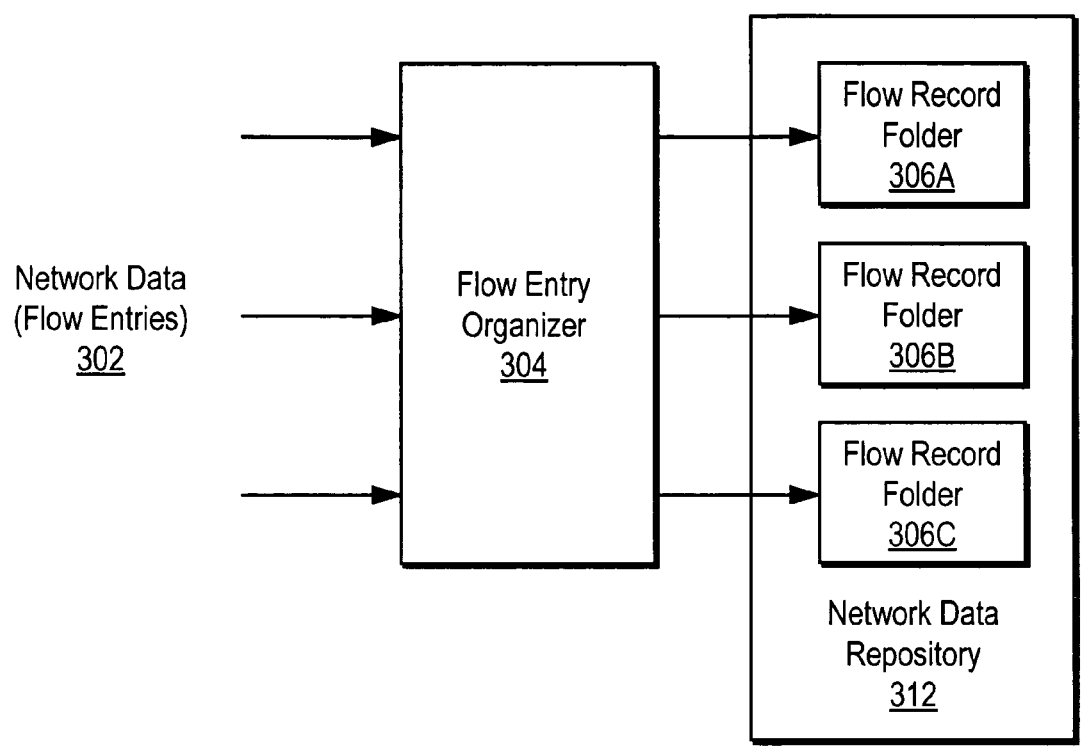
FIG. 3 illustrates the organization and storage of network data in a network data repository, according to one embodiment of the present invention.

FIG. 3 illustrates the organization and storage of network data in a network data repository, according to one embodiment of the present invention. Network data 302, typically in the form of flow entries, is received by the visualizer 102. A flow entry is a basic unit of network data, describing some event or events occurring on the network during a particular period of time. A 'flow' is generally a set of packets that share a common property. For example, in one embodiment, a flow can be defined as a set of packets having common source IP address, destination IP address, application, and Type of Service (ToS).

The flow entry organizer 304 can be implemented, for example, as software executing on the visualizer 102. The flow entry organizer 304 organizes the network data 302 and stores the data in the network data repository 312. The network data repository 312 can be stored, for example, in a storage module within the visualizer 102, or at a remote location.

The network data repository 312 includes a plurality of flow record folders 306. A flow record folder 306 contains network data collected from a network. Various embodiments of flow record folders 306 are described herein with reference to FIGS. 4-6. The flow record folders 306 can be stored in a common network data repository 312, as shown in the figure, or according to another embodiment, they can be stored in a network data repository 312 spanning a plurality of physical locations. For example, flow record folder 306A can be stored in the visualizer 102, flow record folder 306B can be stored in a first remote location, flow record folder 306C can be stored in a second remote location, and so on.

According to one embodiment of the present invention, each flow record folder 306 stores network data organized with a specific table size and with flow records having time stamps of a specific granularity. Different flow record folders 306 can store network data organized with different table size and with flow records with time stamps of different granularities. Storing network data in a network data repository 312 made up of different flow record folders 306 with different organizational properties beneficially facilitates efficient use of storage space and rapid retrieval of network data.

Figure 4:
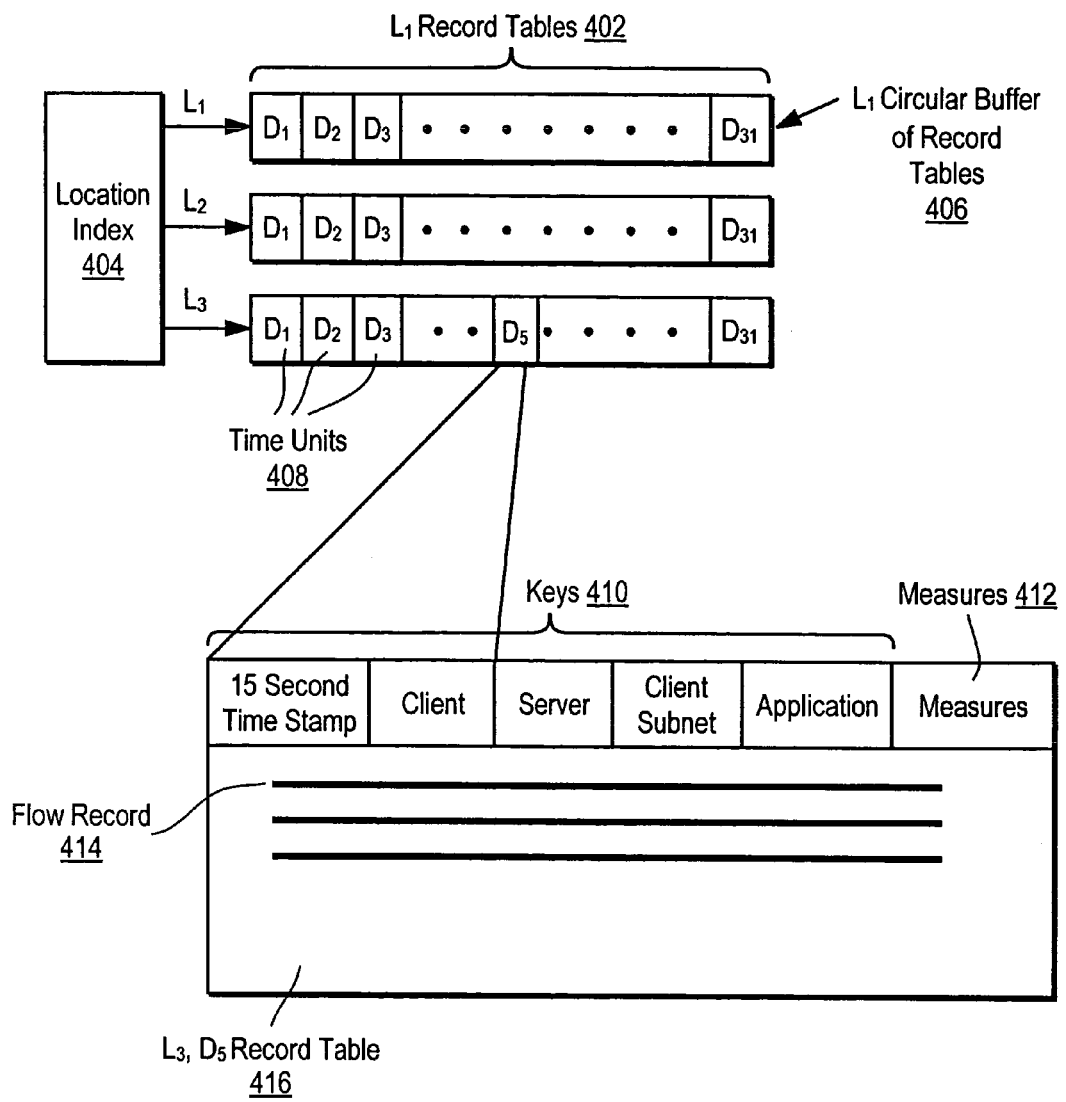
FIG. 4 illustrates an example of a flow record folder, according to one embodiment of the present invention.

Referring now to FIG. 4, an example of a first flow record folder (such as the flow record folder 306A) is illustrated, according to one embodiment of the present invention. The flow record folder 306A includes a location index 404. The location index 404 maps the location of a flow entry to a circular buffer of record tables. The location of a flow entry is a description of the point on the network at which the measures of the flow entry were collected. For example, a location might describe a particular router, a computer, or component of software responsible for the network traffic measured by the flow entry. Other examples of locations will be apparent to one of skill in the art without departing from the scope of the present invention. According to one embodiment of the present invention, a location describes the sniffer 104 that collected the flow entry.

In the example illustrated, location L1 maps to the L1 circular buffer of record tables 406. The L1 circular buffer of record tables 406 includes network data collected at the L1 location.

Each circular buffer of record tables includes a plurality of record tables. Each record table contains flow records occurring within a specific period of time. The period of time for which a table contains records is called the "table size" of that record table. For example, in the flow record folder 306A, each table contains network data collected on a particular day. The record tables of the flow record folder 306A have table size of one day.

A record table can be implemented, for example, using any available database. The various record tables of a circular buffer of record tables can be implemented as separate databases, thereby increasing efficiency by keeping the size of any one database comparatively small. The various record tables need not be stored on the same physical medium, and, in one embodiment, can even be controlled by different database management applications.

Network data is stored a flow record 414 in a record table in a circular buffer of record tables. Network data is organized and stored in the circular buffer of record tables based on the location and time of the collection of the network data. A flow record 414 contains at least a time stamp and a location. In one embodiment, the time stamp and the location are stored together as a block ID, such as the one described herein with reference to FIG. 11.

The time at which network data was collected can be used to determine the record table in which the network data should be stored or retrieved. For example, the time at which the network data was collected can be used to determine a time unit 408 of the flow record. A time unit 408 indicates the time at which the network data was collected with a granularity that is consistent with the table size. For example, if the table size of the record tables is one day, then a time unit will indicate on which day the network data was collected. For example, a time unit might specify that network data was collected on Aug. 4, 2005. According to one embodiment of the present invention, time units can also describe time relative to a starting time, using for example, a time measurement method such as the one described herein with reference to FIG. 11. For example, a time unit might specify that network data was collected on day 368.

A flow record's time unit 408 can be used to index an individual record table within a circular buffer of record tables. The time unit 408 indicates the particular record table in which the network data can be stored or retrieved. For example, network data collected on a first day of the month is stored in the D1 record table, network data collected on a second day of the month is stored in the D2 record table, and so on.

When the day on which the network data was collected exceeds the number of record tables, the entry wraps back to the beginning of the circular buffer of record tables. In the example illustrated, the L1 circular buffer of record tables 406 includes thirty-one record tables. Thus, network data collected on a given day of the month is stored in the record table associated with that day. Network data collected on the first day of the month is stored in the D1 record table, network data collected on the second day of the is stored in the D2 record table, and so on. According to one embodiment of the present invention, twenty-eight days of network data are stored in the circular buffers of record tables at any one time. When a record table contains network data older than twenty-eight days, the record table is cleared and the network data contained therein is erased. In this way, the most up-to-date network data is available in the frame record folder.

A record table contains network data collected at a specific location during a specific period of time. For example, the L3, D5 record table 416 contains network data collected at location 3 on day 5 of month 5. Because of the buffer of record tables is circular, the L3, D5 record table 416 can instead contain network data collected at location 3 on day 5 of month 6, or at location 3 on day 5 of month 7, and so on. In the example illustrated, a record table contains network data collected at a common location and during a common time unit (for example, a common day).

The L3, D5 record table 416 contains one or more flow records 414. A flow record 414 is an entry in the record table. The flow record 414 includes a time stamp, and one or more measures 412 describing network activity at location 3 during the time period described by the time stamp. The time period described by the time stamp falls within the time unit indexing the flow record 414 to the record table 416. In the example illustrated, the flow record 414 includes a time stamp describing a 15 second period of time that occurred on day 5.

According to one embodiment of the present invention, the flow record 414 can also include other various keys 410. For example, the flow record 414 can include network data identifying the client, the server, the client subnet, and/or the application of the network activity of the flow record 414. The keys 410 can also include Type of Service (ToS), Multiprotocol Label Switching (MPLS), and other identifiers as will be apparent to one of skill in the art. The examples of keys 410 have been chosen for the purposes of illustration and are not limiting. Other keys 410 can be included in the flow record 414 without departing from the scope of the present invention.

By storing flow records in a record table in circular buffer of record tables, the comparative size of any one record table is reduced, saving storage space and reducing retrieval times. Furthermore, by organizing the circular buffers with a specific table size, the flow record of network activity during a particular time unit can be rapidly retrieved and analyzed.

Figure 5:
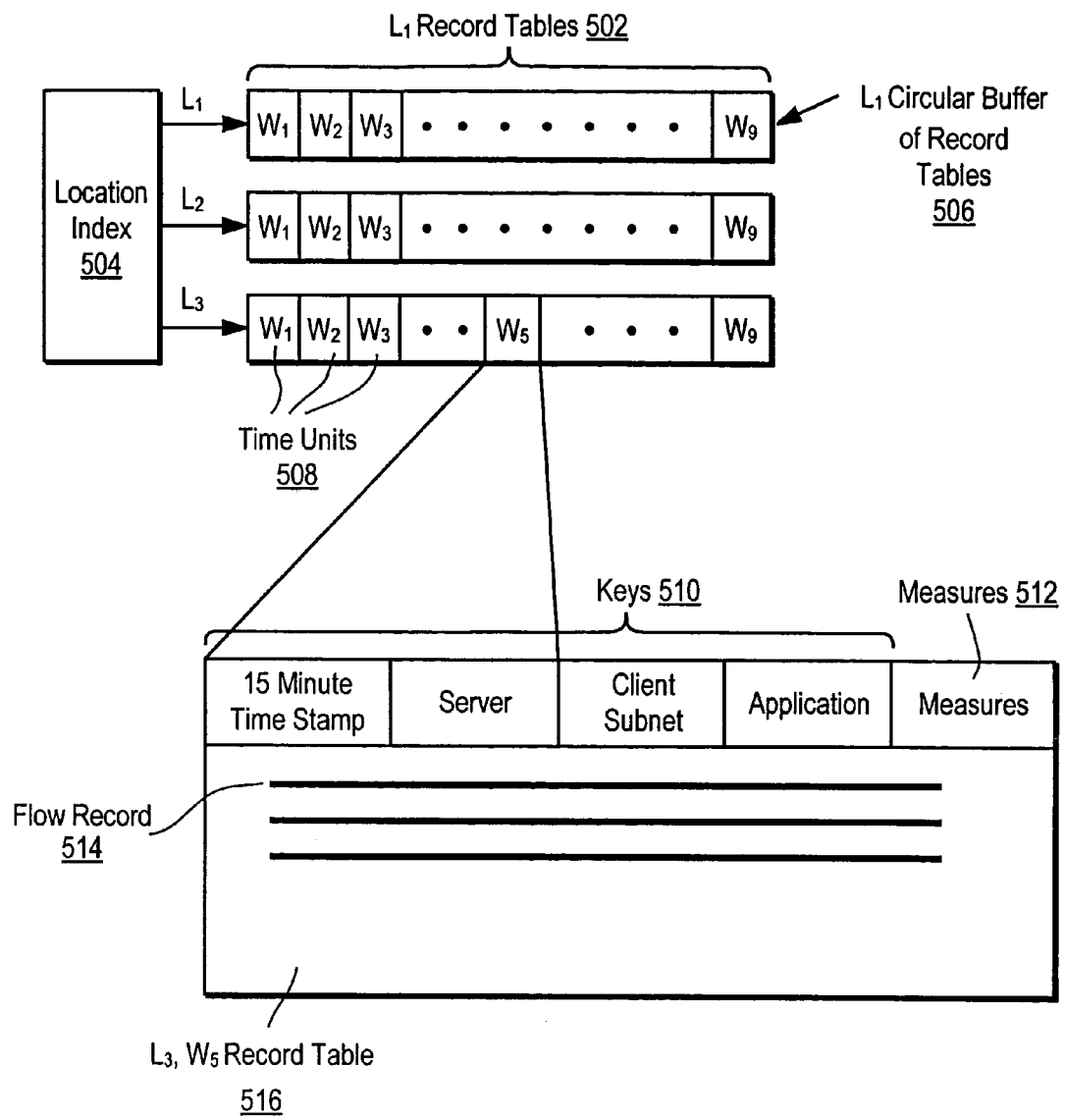
FIG. 5 illustrates another example of a flow record folder, according to one embodiment of the present invention.

FIG. 5 illustrates another example of a flow record folder, according to one embodiment of the present invention. FIG. 5 illustrates the organization of the flow record folder 306B. Similar to the flow record folder 306A, the flow record folder 306B includes a location index 504. The location index 504 maps the location of a flow entry to a circular buffer of record tables. In the example illustrated, location L1 maps to the L1 circular buffer of record tables 506. The L1 circular buffer of record tables 506 includes network data collected at the L1 location.

Each circular buffer of record tables includes a plurality of record tables. Each record table contains flow records occurring within a specific period of time. The period of time for which a table contains records is called the "table size" of that record table. For example, in the flow record folder 306B, each table contains network data collected on a particular week. The record tables of the flow record folder 306B have table size of one week.

Network data is stored a flow record 514 in a record table in a circular buffer of record tables. Network data is organized and stored in the circular buffer of record tables based on the location and time of the collection of the network data. A flow record 514 contains at least a time stamp and a location. In one embodiment, the time stamp and the location are stored together as a block ID, such as the one described herein with reference to FIG. 11.

The time at which network data was collected can be used to determine the record table in which the network data should be stored or retrieved. For example, the time at which the network data was collected can be used to determine a time unit 508 of the flow record. A time unit 508 indicates the time at which the network data was collected with a granularity that is consistent with the table size. For example, if the table size of the record tables is one week, then a time unit will indicate the week during which the network data was collected. For example, a time unit might specify that network data was collected on the $31^{st}$ week of 2005. According to one embodiment of the present invention, time units can also describe time relative to a starting time, using for example, a time measurement method such as the one described herein with reference to FIG. 11. For example, a time unit might specify that network data was collected on week 53.

A flow record's time unit 508 can be used to index an individual record table within a circular buffer of record tables. The time unit 508 indicates the particular record table in which the network data can be stored or retrieved. For example, network data collected on a first week is stored in the W1 record table, network data collected on a second week is stored in the W2 record table, and so on.

When the week on which the network data was collected exceeds the number of record tables, the entry wraps back to the beginning of the circular buffer of record tables. In the example illustrated, the L1 circular buffer of record tables 506 includes nine record tables. Thus, network data collected on a tenth week is stored in the W1 record table, network data collected on a eleventh week is stored in the W2 record table, and so on. When every record table has been used, the record table containing the oldest network data is erased and reused. In this way, the most up-to-date network data is available in the frame record folder.

A record table contains network data collected at a specific location during a specific period of time. For example, the L3, W5 record table 516 contains network data collected at location 3 on week 5. Because of the buffer of record tables is circular, the L3, W5 record table 516 can instead contain network data collected at location 3 on week 14, or at location 3 on week 23, and so on. In the example illustrated, a record table contains network data collected at a common location and during a common time unit (for example, a common week).

The L3, W5 record table 516 contains one or more flow records 514. A flow record 514 is an entry in the record table. The flow record 514 includes a time stamp, and one or more measures 512 describing network activity at location 3 during the time period described by the time stamp. The time period described by the time stamp falls within the time unit indexing the flow record 514 to the record table 516. In the example illustrated, the flow record 514 includes a time stamp describing a 15 minute period of time that occurred on week 5.

According to one embodiment of the present invention, the flow record 514 can also include other various keys 510. For example, the flow record 514 can include network data identifying the server, the client subnet, and/or the application of the network activity of the flow record 514. The keys 510 can also include Type of Service (ToS), Multiprotocol Label Switching (MPLS), and other identifiers as will be apparent to one of skill in the art. The examples of keys 510 have been chosen for the purposes of illustration and are not limiting. Other keys 510 can be included in the flow record 514 without departing from the scope of the present invention.

By storing flow records in a record table in circular buffer of record tables, the comparative size of any one record table is reduced, saving storage space and reducing retrieval times. Furthermore, by organizing the circular buffers with a specific table size, the flow record of network activity during a particular time unit can be rapidly retrieved and analyzed.

Figure 6:
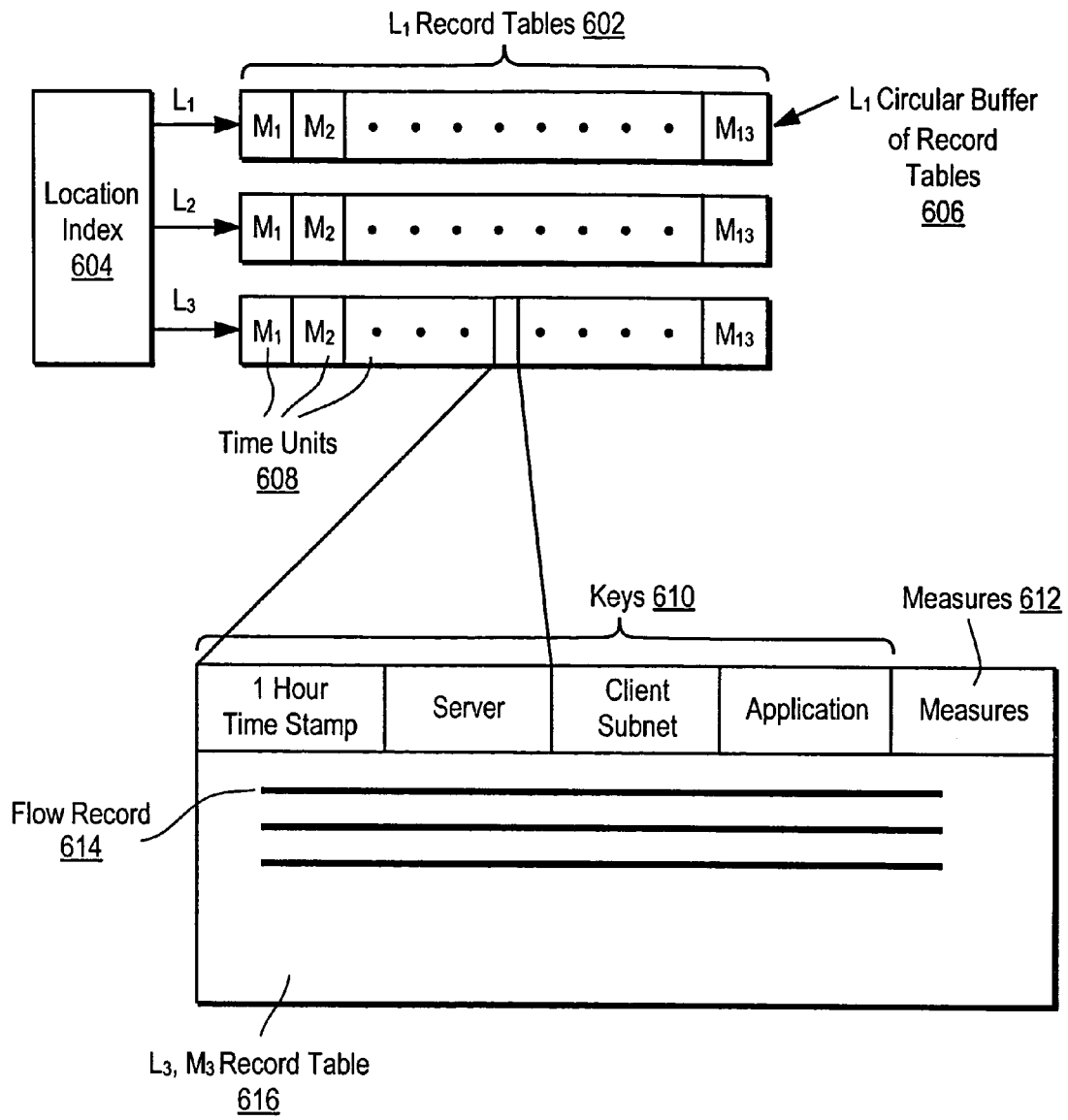
FIG. 6 illustrates yet another example of a flow record folder, according to one embodiment of the present invention.

FIG. 6 illustrates another example of a flow record folder, according to one embodiment of the present invention. FIG. 6 illustrates the organization of the flow record folder 306C. Similar to the flow record folder 306A, the flow record folder 306C includes a location index 604. The location index 604 maps the location of a flow entry to a circular buffer of record tables. In the example illustrated, location L1 maps to the L1 circular buffer of record tables 606. The L1 circular buffer of record tables 606 includes network data collected at the L1 location.

Each circular buffer of record tables includes a plurality of record tables. Each record table contains flow records occurring within a specific period of time. The period of time for which a table contains records is called the "table size" of that record table. For example, in the flow record folder 306C, each table contains network data collected on a particular month. The record tables of the flow record folder 306C have table size of one month.

Network data is stored a flow record 614 in a record table in a circular buffer of record tables. Network data is organized and stored in the circular buffer of record tables based on the location and time of the collection of the network data. A flow record 614 contains at least a time stamp and a location. In one embodiment, the time stamp and the location are stored together as a block ID, such as the one described herein with reference to FIG. 11.

The time at which network data was collected can be used to determine the record table in which the network data should be stored or retrieved. For example, the time at which the network data was collected can be used to determine a time unit 608 of the flow record. A time unit 608 indicates the time at which the network data was collected with a granularity that is consistent with the table size. For example, if the table size of the record tables is one month, then a time unit will indicate the month during which the network data was collected. For example, a time unit might specify that network data was collected on the $8^{th}$ month of 2005. According to one embodiment of the present invention, time units can also describe time relative to a starting time, using for example, a time measurement method such as the one described herein with reference to FIG. 11. For example, a time unit might specify that network data was collected on the $12^{th}$ month since the starting time.

A flow record's time unit 608 can be used to index an individual record table within a circular buffer of record tables. The time unit 608 indicates the particular record table in which the network data can be stored or retrieved. For example, network data collected on a first month is stored in the M1 record table, network data collected on a second month is stored in the M2 record table, and so on.

When the month on which the network data was collected exceeds the number of record tables, the entry wraps back to the beginning of the circular buffer of record tables. In the example illustrated, the L1 circular buffer of record tables 606 includes thirteen record tables. Thus, network data collected on a fourteenth month is stored in the M1 record table, network data collected on a fifteenth month is stored in the M2 record table, and so on. When every record table has been used, the record table containing the oldest network data is erased and reused. In this way, the most up-to-date network data is available in the frame record folder.

A record table contains network data collected at a specific location during a specific period of time. For example, the L3, M3 record table 616 contains network data collected at location 3 on month 3. Because of the buffer of record tables is circular, the L3, M3 record table 616 can instead contain network data collected at location 3 on month 16, or at location 3 on month 29, and so on. In the example illustrated, a record table contains network data collected at a common location and during a common time unit (for example, a common month).

The L3, M3 record table 616 contains one or more flow records 614. A flow record 614 is an entry in the record table. The flow record 614 includes a time stamp, and one or more measures 614 describing network activity at location 3 during the time period described by the time stamp. The time period described by the time stamp falls within the time unit indexing the flow record 614 to the record table 616. In the example illustrated, the flow record 614 includes a time stamp describing a 1 hour period of time that occurred on month 3.

According to one embodiment of the present invention, the flow record 614 can also include other various keys 610. For example, the flow record 614 can include network data identifying the server, the client subnet, and/or the application of the network activity of the flow record 614.

The keys 610 can also include Type of Service (ToS), Multiprotocol Label Switching (MPLS), and other identifiers as will be apparent to one of skill in the art. The examples of keys 610 have been chosen for the purposes of illustration and are not limiting. Other keys 610 can be included in the flow record 614 without departing from the scope of the present invention.

By storing flow records in a record table in circular buffer of record tables, the comparative size of any one record table is reduced, saving storage space and reducing retrieval times. Furthermore, by organizing the circular buffers with a specific table size, the flow record of network activity during a particular time unit can be rapidly retrieved and analyzed.

Figure 7:
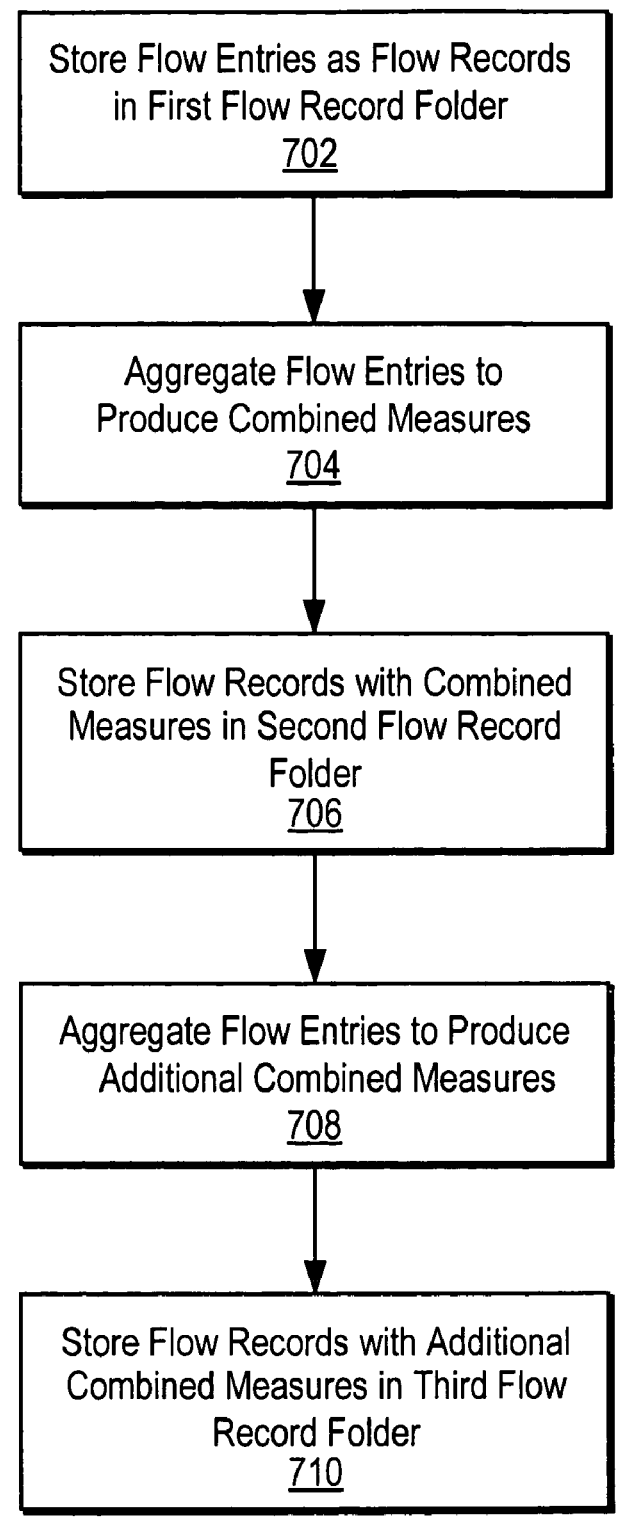
FIG. 7 illustrates a method for organizing and storing network data, according to one embodiment of the present invention.

FIG. 7 illustrates a method for organizing and storing network data, according to one embodiment of the present invention. According to one embodiment of the present invention, the method is performed by the flow entry organizer 304.

The flow entry organizer 304 stores 702 flow entries as flow records in a first flow record folder. For example, the flow entry organizer 304 can store 702 flow entries in a flow record folder such as the flow record folder 306A, and organized as described herein with reference to FIG. 4. A method for storing a flow record in a flow record folder, according to one embodiment of the present invention, is described herein with reference to FIG. 8.

The flow entry organizer 304 aggregates 704 flow entries to produce combined measures. A method for aggregating flow entries, according to one embodiment of the present invention, is described herein with reference to FIG. 9.

The flow entry organizer 304 stores 706 flow records containing the combined measures in a second flow record folder. For example, the flow entry organizer 304 can store 702 flow records in a flow record folder 306B, and organized as described herein with reference to FIG. 5. A method for storing flow records, according to one embodiment of the present invention, is described herein with reference to FIG. 8.

According to one embodiment of the present invention, the aggregation and storage process can continue to additional level of depths as desirable. For example, the method can further include aggregating 708 flow entries to produce additional combined measures and storing 710 flow records with additional combined measures in a third flow record folder, such as the flow record folder 306C.

According to one embodiment of the present invention, the first flow record folder is organized differently the second flow record folder. In one embodiment, the circular buffers of record tables of the various flow record folders can be indexed by different time units. For example, the circular buffers of record tables of the first flow record folder can be indexed by days, and the circular buffers of record tables of the second flow record folder can be indexed by weeks. In another embodiment, the time stamps of the flow records of the various flow record folders can have different granularities. For example, the time stamps of the flow records of the first flow record folder can describe a fifteen second period of time and the time stamps of the flow records of the second flow record folder can describe a fifteen minute period of time In yet another embodiment, flow records of the various flow record folders can include different keys. For example, the flow records of the first flow record folder can include a timestamp, client, server, client subnet and application, and the flow records of the second flow record folder can include a timestamp, server, client subnet and application. The keys included in the flow records of various flow record folders, according to one embodiment of the present invention, is described herein with reference to FIG. 10.

Storing network data in various differently organized flow record folders facilitates the efficient storage and retrieval of network data. According to one embodiment of the present invention, the second flow record folder contains network data collected over a larger time frame than the network data of the first flow record folder. The first flow record folder contains more detailed flow records, with more keys and more specific time stamps. In this way, network data is available with a high level of detail for recent activity, and network data from older activity is also available with a lower level of detail, while efficiently using available storage space on the network data repository.

Figure 8:
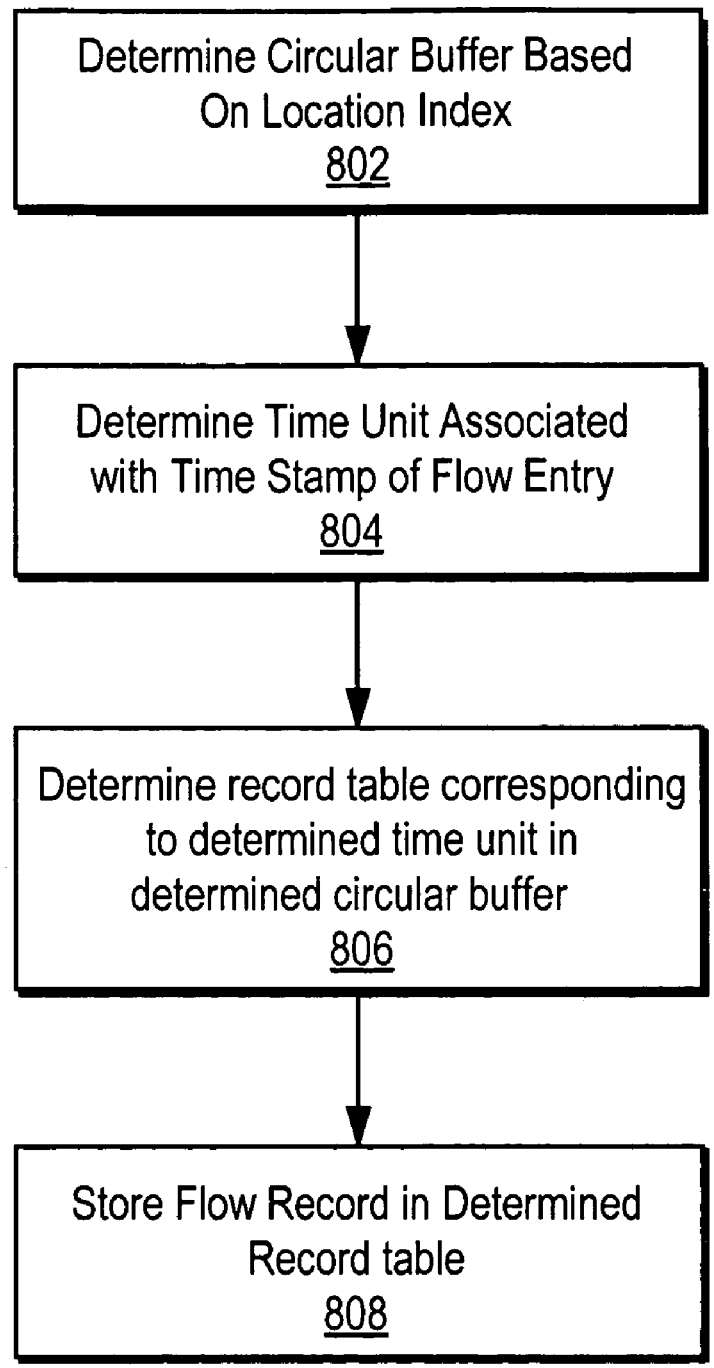
FIG. 8 illustrates a method for storing a flow record in a flow record folder, according to one embodiment of the present invention.

FIG. 8 illustrates a method for storing a flow record in a flow record folder, according to one embodiment of the present invention. According to one embodiment of the present invention, the method is performed by the flow entry organizer 304. The method can be used to store a flow record based on a flow entry or a combined measure. References herein to specific properties of a flow entry should be understood to also include properties of a combined measure, and/or properties of the flow entries that formed the combined measure.

The flow entry organizer 304 determine 802 a circular buffer based on the location index and the location of the flow entry. As described previously, the flow record folder includes a location index mapping the location of flow entries to circular buffer of record tables. The location index indicates a circular buffer to which the network data of the flow entry should be stored.

The flow entry organizer 304 determines 804 a time unit associated with the time stamp of the flow entry. The circular buffer of record tables of a flow record folder is organized based on some table size. For example, a circular buffer of record tables can be organized based on days. The flow entry organizer 304 determines the day associated with the time stamp of the flow entry by determining the day containing the time period indicated by the time stamp.

The flow entry organizer 304 determines 806 the record table corresponding to the determine 804 time unit in the determined 802 circular buffer of record tables. As described previously, the time unit may exceed the number of record tables in the circular buffer, and the determination 806 may wrap to the oldest record table in the circular buffer. The record table 806 can contain flow records of network data collected at the same location on the same day as the flow entry.

The flow entry organizer 304 stores 808 a flow record in the determined 806 record table. The stored flow record includes the time stamp of the flow entry. According to one embodiment of the present invention, the time stamp of the stored flow record specifies a time with a granularity different than that of the flow entry. For example, the flow entry can specify a time with a granularity of 1 second, and the time stamp of the stored flow record can specify a time with a granularity of 15 seconds. Storing the flow record as described herein facilitates the rapid retrieval of network data.

Figure 9:
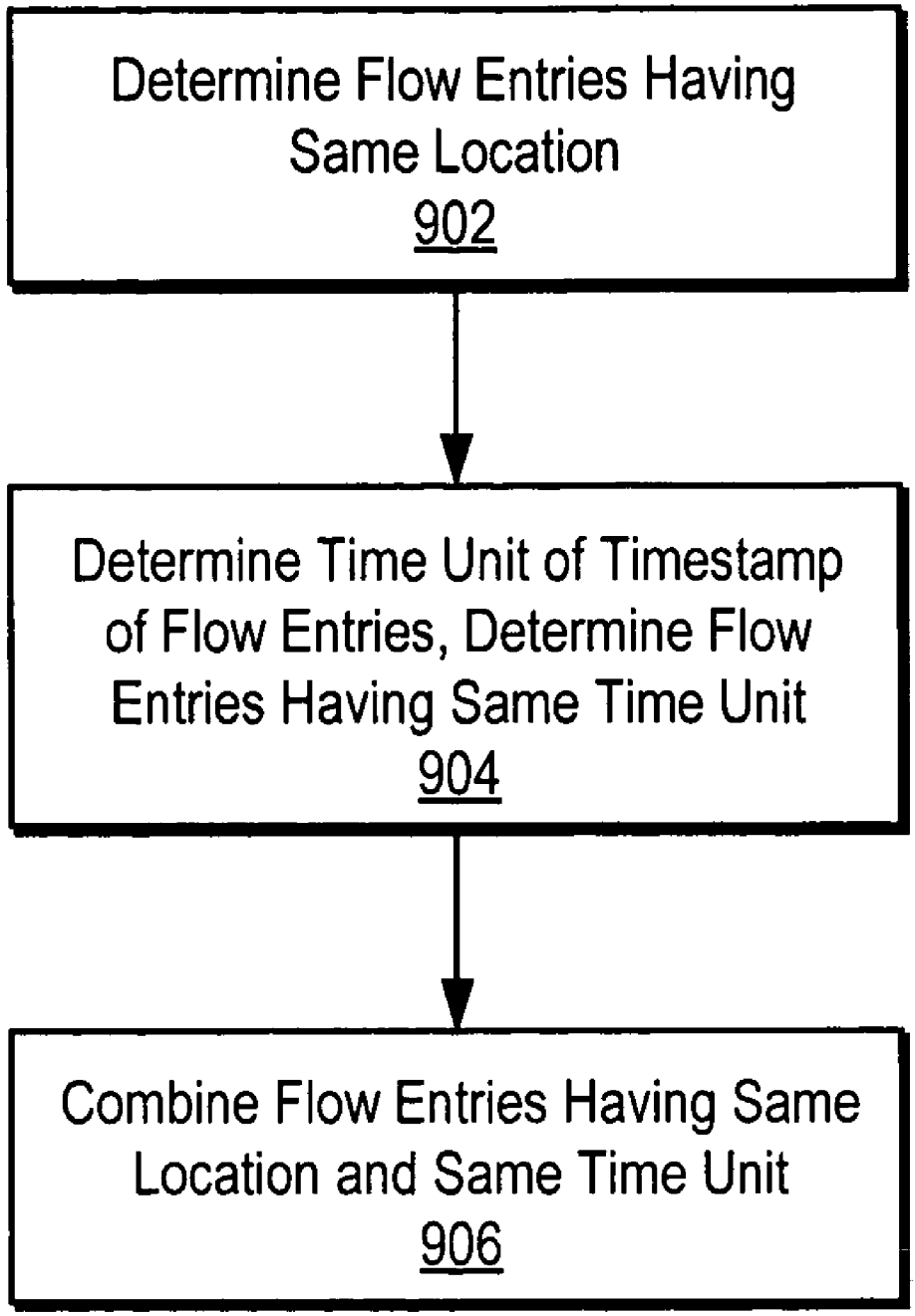
FIG. 9 illustrates a method for aggregating flow entries, according to one embodiment of the present invention.

FIG. 9 illustrates a method for aggregating flow entries, according to one embodiment of the present invention. According to one embodiment of the present invention, the method is performed by the flow entry organizer 304.

The flow entry organizer 304 determines 902 two (or more) flow entries having the same location. According to one embodiment of the present invention, the two or more flow entries having the same location can be determined from flow records in a flow record folder. The determined 902 flow entries describe network activity within time periods occurring within a common time unit, as described in step 904.

The flow entry organizer 304 determines 904 a time unit associated with the determined 902 flow entries based on the time stamps of the flow entries. According to one embodiment of the present invention, the flow entry organizer determines a time unit of the determined 902 flow entries consistent with the table size of the flow record folder in which the combined measure will be stored. For example, if the circular buffer of record tables of the flow record folder in which the combined measure will be stored is organized by weeks, the flow entry organizer 304 will determine a week of the determined 902 flow entries. The determined 904 time unit is associated with the time stamps of the determined 902 flow entries. For example, if the determined 904 time unit is a particular week, then both of determined 902 flow entries describe network activity for time periods during that week.

The flow entry organizer 304 combines 906 the determined 904 flow entries. For example, the flow entry organizer 304 can combine the measures of the determined 904 flow entries to produce a combined measure. According to one embodiment of the present invention, combining 906 the determined 904 flow entries includes determining if the keys of the respective flow entries match, and responsive to determining the keys match, combining the measures of the flow entries. For example, two flow entries with the same server key would be combined. In one embodiment, some keys are not considered for determining whether to combine the measures of the flow entries. For example, the client may not be considered for determining whether to combine the measures of the flow entries. If two flow entries have the same client subnet, they would be combined, regardless of having different clients. Aggregating the flow entries to produce a combined measure reduces the amount of data to be stored, and thereby facilitates the retention of network data for longer periods of time.

FIG. 10 illustrates the organization of network data in various flow record folders, according to one embodiment of the present invention. Different flow record folders are organized different table size and with flow records containing different keys.

The flow record folder 306A includes circular buffers of record tables with a table size 1004 of a day. Each record table in a circular buffer of record tables stores flow records for a specific one-day period. A flow record of the flow record folder 306A includes the keys location 1006, client 1008, server 1010, application 1012, client subnet 1014, and time stamp 1016 with 15 second granularity, as well as measures 1018.

The flow record folder 306B includes circular buffers of record tables with a table size 1004 of a week. The flow record folder 306B includes network data collected over a longer period of time than the flow record folder 306A. To store the network data collected over a longer period of time efficiently, the flow record folder 306B contains network data aggregated by keys and by time stamp. A flow record of the flow record folder 306B includes the keys location 1006, application 1012, client subnet 1014, and time stamp with 15 minute granularity, as well as measures 1018, but does not include client 1008. Because client 1008 is not included in the flow records of the flow record folder 306B, the flow records of the flow record folder do not separate measures by client 1008. The measures of two flow entries having different clients but matching in other keys would be aggregated into a combined measured and stored as a single flow record in the flow record folder 306B. Additionally, the time stamp 1016 stored in the flow records of the flow record folder 306B have a granularity of 15 minutes. The measures of two flow entries matching in keys and collected within the same fifteen minute period will be aggregated into a combined measure and stored as a single flow record.

According to one embodiment of the present invention, the server 1010 of a flow record can be modified in the flow record folder 306A and/or flow record folder 306B. Certain values of server 1010 will be considered undesired and the network data for these servers will be combined into a unified "catch-all" server.

The flow record folder 306C includes circular buffers of record tables with a table size 1004 of a month. The flow record folder 306C includes network data collected over a longer period of time than the flow record folder 306B. To store the network data collected over a longer period of time efficiently, the flow record folder 306C contains network data further aggregated by time stamp. The time stamp 1016 stored in the flow records of the flow record folder 306C have a granularity of 1 hour. The measures of two flow entries matching in keys and collected within the same 1 hour period will be aggregated into a combined measure and stored as a single flow record.

As will be appreciated by one of skill in the art, the organization of the network data repository 312 described herein is particularly beneficial for the storage of network data. Measures keyed with the most detail are available for network data collected in the most recent time frame (such as in the last 28 days). These flow entries are broken down by the largest number of keys, and by time stamp with the most specific granularity. Measures keyed with more generalized detail are available for network data in a less recent time frame (such as in the last 8 weeks). These flow entries are broken down with a fewer number of keys, and by time stamp with less granularity. By breaking down the flow entries with fewer keys and by time stamps of less granularity, measures can be aggregated and storage space in the network data repository conserved, while making network data in the last 8 weeks available for rapid access. Measures keyed with even more generalized detail are available for network data in an even less recent time frame (such as in the last 13 months). These flow entries are broken down by time stamp with less granularity. By breaking down the flow entries with time stamps of less granularity, measures can be aggregated and storage space in the network data repository conserved, while making network data in the last 13 months available for rapid access.

Figure 11:
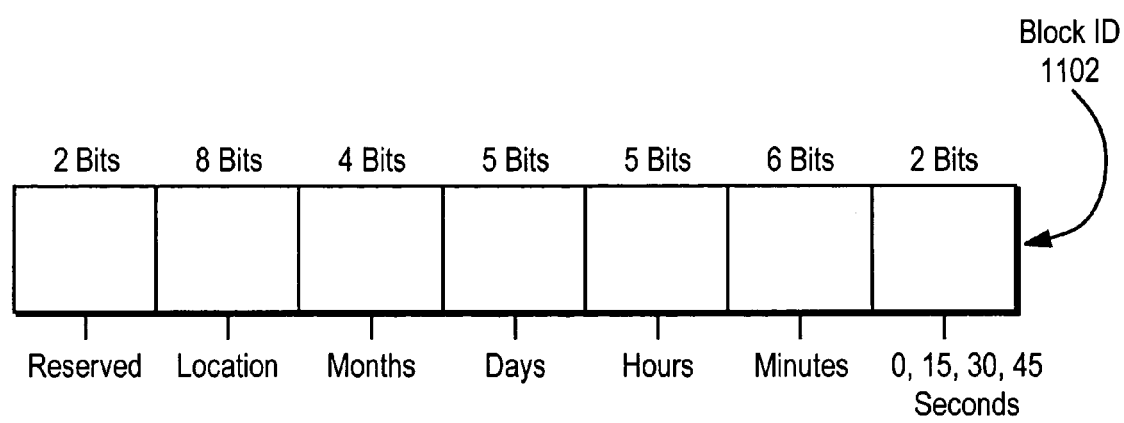
FIG. 11 illustrates a data structure for storing a location and time stamp, according to one embodiment of the present invention.

FIG. 11 illustrates a data structure for storing a location and time stamp, according to one embodiment of the present invention. In one embodiment, the visualizer 102 is implemented on a computer system in which data is organized by 32 bit words. In such a computer system, there is a significant data access and processing benefit when an operation is performed on a single word, as opposed to being performed on multiple words. The data structure shown in the figure and described herein advantageously facilitates processing of network data by including location and time stamp information within a single 32 bit word, also referred to as a block ID 1102. According to one embodiment of the present invention, flow records include a block ID 1102 which includes the location and time stamp of the flow record.

According to one embodiment of the present invention, time stamps are given with reference to a unified starting time. For example, the unified starting time can be midnight on Aug. 1, 2004. A time stamp indicates an event time by describing the amount of time that has passed between the starting time and the event time. For example, if a time stamp value was two days, that time stamp would indicated that the event occurred at midnight on Aug. 3, 2004. As another example, if a time stamp value was one year, one hour, ten minutes, that time stamp would indicated that the event occurred at one hour ten minutes after midnight on Aug. 1, 2005.

The block ID 1102 includes a 2 bit seconds field indicating a number of seconds since the unified starting time. As there are four possible values for the 2 bit seconds field, the seconds are given in 15 second increments. For example, the seconds field indicates a time of 0, 15, 30, 45 seconds past the minute. Events occurring between these increments are rounded to the next increment.

The block ID 1102 includes a 6 bit minutes field indicating a number of minutes since the unified starting time. The minutes field contains a value between 0 and 59.

The block ID 1102 includes a 5 bit hours field indicating the number of hours since the unified starting time. The hours field contains a value between 0 and 23.

The block ID 1102 includes a 5 bit days field indicating the number of days since the unified starting time. The days field contains a value between 0 and 31.

The block ID 1102 includes a 4 bit months field indicating the number of months since the unified starting time. The months field contains a value between 0 and 11.

The block ID 1102 includes an 8 bit location field. Each location at which network data is collected contains a unique location value. This value is stored in the 8 bit location field of the block ID 1102.

The block ID 1102 includes a 2 bit reserved field.

By storing the location and the time stamp in a 32 bit word, flow records with specific locations and time stamps can be quickly identifying and retrieved by the processor. Storing the location and the time stamp facilitates processor-efficient bit-masking. A mask is created to select the desired fields of the block ID 1102. The mask is OR'ed with the block ID 1102, resulting in a masked block ID. The masked block ID can then be compared to a search word to determine if the block ID 1102 contains the desired data in the desired fields. Single-word OR's and comparisons can typically be executed extremely rapidly on a processor. Storing location and time stamp as a single word beneficially facilitates efficient storage and rapid search and retrieval of network data.

Figure 12:
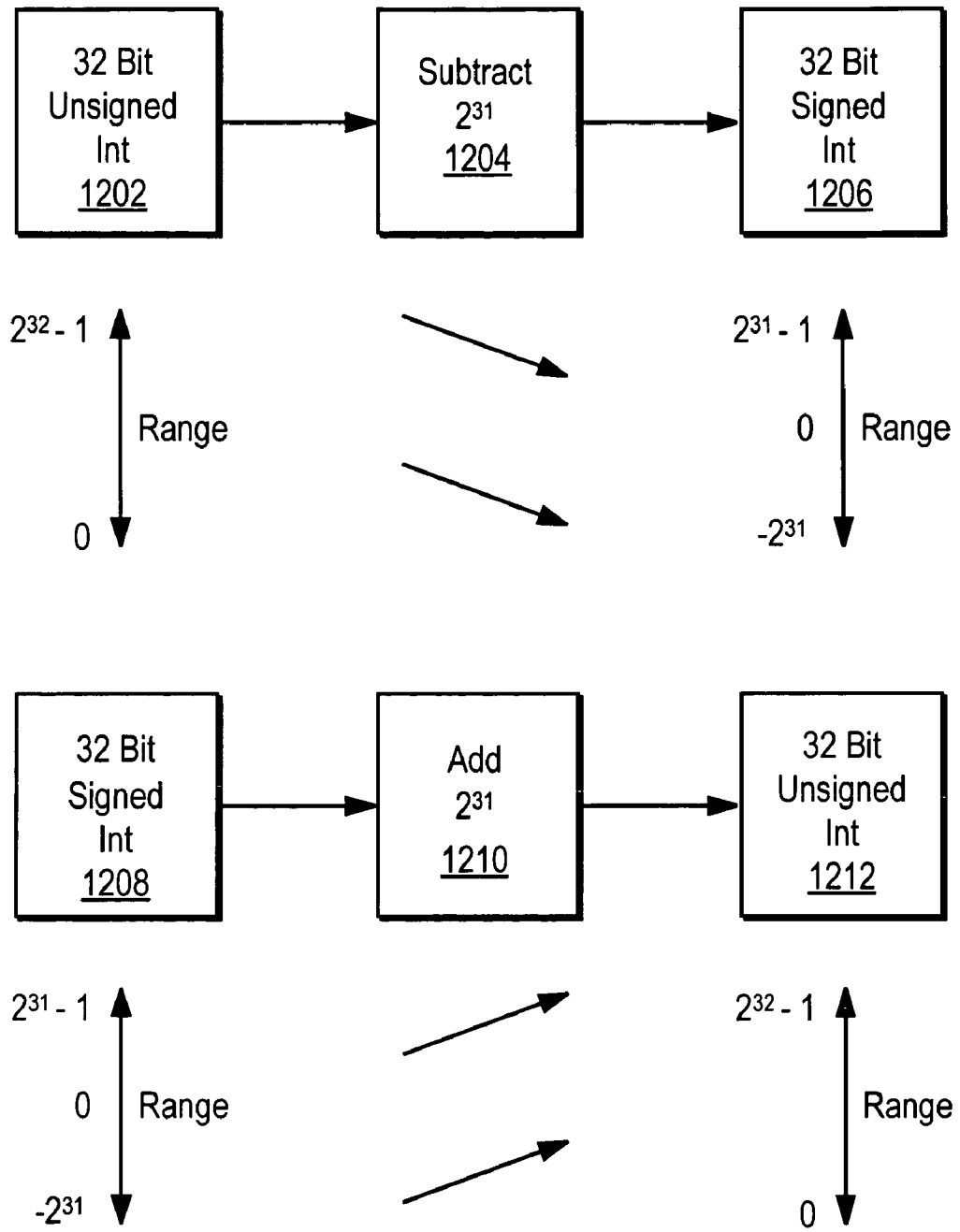
FIG. 12 illustrates a method for storing a TCP/IP address as a 32-bit signed integer, according to one embodiment of the present invention.

FIG. 12 illustrates a method for storing a TCP/IP address as a 32-bit signed integer ("int"), according to one embodiment of the present invention. The keys of client, server, and client subnet are typically given by TCP/IP addresses. Because these keys occur in the flow record folders so frequently, reducing the storage size of a TCP/IP address results in a large improvement in the storage efficiency of the network data repository.

TCP/IP addresses contain 4 fields of 8 bits each (in IPv4) for a total of 32 unsigned bits. There are $2^{32}$ possible TCP/IP addresses, ranging in value from 0 to $2^{32}-1$. However, efficiently storing a TCP/IP address in a flow record in a record table poses a challenge, because many record tables provide fields of 32 bit signed integers. 32 bit signed integers are typically only capable of storing 31 bits of integer, allowing 1 bit for storing of sign information. In conventional databases, a TCP/IP address typically occupies two 32 bit signed integers, since the 32 bits of TCP/IP address exceed the 31 bits of integer storage available in a 32 bit signed integer.

According to one embodiment of the present invention, a TCP/IP address is stored as a single 32 bit signed integer. Because the range of a 32 bit signed integer is from $-2^{31}$ to $2^{31}-1$, a 32 bit signed integer has the same number of possible values as a 32 bit unsigned integer. Therefore, by using all 32 bits of the signed integer, a TCP/IP address can be stored as a single 32 bit signed integer.

The method encodes a 32 bit unsigned integer 1202 (for example, a TCP/IP address). $2^{31}$ is subtracted 1204 from the 32 bit unsigned integer 1202. The result is a downshifting of the possible values of the integer. The value $2^{32}-1$ is now at $2^{31}-1$, the value 0 is now at $-2^{31}$, and so on. The range of values of the integer is now the same as that of a 32 bit signed integer, and the result of the subtraction 1204 can be stored as 32 bit signed integer 1206. Advantageously, the subtraction 1204 preserves the ordering of values, so order-based comparisons of the 32 bit unsigned integer 1202 will achieve the same result when performed on the 32 bit signed integer 1206 instead. The 32 bit signed integer can be stored as a single word in a flow record, reducing the use of storage space in the network data repository.

When a flow record is retrieved, it is often desirable to return a TCP/IP address in its original form. The TCP/IP address is encoded as a bit 32 signed integer 1208. As discussed previously, the 32 bit signed integer 1208 has a range from $-2^{31}$ to $2^{31}-1$. $2^{31}$ is added 1210 to the 32 bit signed integer 1208. The result is an upshifting of the possible values of the integer. The value $2^{31}-1$ is now at $2^{32}-1$, the value $-2^{31}$ is now at 0, and so on. The range of values of the integer is now the same as that of a 32 bit unsigned integer, and the result of the addition 1210 can be stored as 32 bit unsigned integer 1212. The unsigned integer 1212 can then be interpreted and used as a TCP/IP address. Advantageously, the subtraction 1204 and addition 1210 return the TCP/IP address to its initial value, which has been successfully stored and retrieved as a single 32-bit word.

Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for storing flow entries in a network data repository comprising a plurality of flow record folders, each flow entry comprising a plurality of keys and at least one measure, the keys comprising a location and a time stamp, the method comprising computer-implemented steps of:

storing a first flow record in a first flow record folder, wherein the first flow record folder comprises a first location index and at least one circular buffer of record tables, and wherein storing the first flow record in the first flow record folder comprises:

responsive to the first location index and the location of a first flow entry, determining a first circular buffer of the first flow record folder;

responsive to a first time unit associated with the time stamp of the first flow entry, determining a first record table of the first circular buffer; and storing the first flow record in the first record table, the first flow record comprising the time stamp of the first flow entry and the at least one measure of the first flow entry;

aggregating the first flow entry and a second flow entry to produce a combined measure, wherein aggregating the first flow entry and a second flow entry comprises:

determining if the location of the first flow entry is the same as the location of the second flow entry;

responsive to determining that the location of the first flow entry is the same as the location of the second flow entry, combining the at least one measure of the first flow entry and the at least one measure of the second flow entry into the combined measure; and determining a second time unit associated with the time stamp of the first flow entry and a time stamp of the second flow entry, the second time unit being different from the first time unit, and the second time unit including the first time unit; and storing a second flow record in a second flow record folder, wherein the second flow record folder comprises a second location index and at least another circular buffer of record tables, and wherein storing the second flow record in the second flow record folder comprises:

responsive to the second location index and the location of the first flow entry, determining a second circular buffer of the second flow record folder;

responsive to the second time unit, determining a second record table of the second circular buffer; and storing the second flow record in the second record table, the second flow record comprising the combined measure.

2. The method of claim 1, wherein the first flow record further comprises the location of the first flow entry.

3. The method of claim 2, wherein the first flow record comprises a 32 bit block ID, said 32 bit block ID comprises the location of the first flow entry and the time stamp of the first flow entry.

4. The method of claim 1, wherein the first flow entry is associated with a first IP address, and wherein the first flow record further comprises a representation of said first IP address.

5. The method of claim 4, wherein the first IP address comprises a client IP address.

6. The method of claim 4, wherein the first IP address comprises a client subnet IP address.

7. The method of claim 4, wherein the first IP address comprises a server IP address.

8. The method of claim 4, wherein storing the first flow record in the first record table comprises:

receiving the first IP address;

subtracting a predetermined number from the first IP address to produce a 32 bit signed integer; and storing the 32 bit signed integer as the representation of the first IP address.

9. The method of claim 1, wherein the second flow record further comprises the location of the first flow entry.

10. The method of claim 9, wherein the first flow record comprises a 32 bit block ID, said 32 bit block ID comprises the location of the first flow entry and the time stamp of the second flow entry.

11. The method of claim 1, wherein the second flow entry is associated with a first IP address, and wherein the second flow record further comprises a representation of said first IP address.

12. The method of claim 11, wherein the first IP address comprises a client subnet IP address.

13. The method of claim 11, wherein the first IP address comprises a server IP address.

14. The method of claim 11, wherein storing the second flow record in the second record table comprises:

receiving the first IP address;

subtracting a predetermined number from the first IP address to produce a 32 bit signed integer; and storing the 32 bit signed integer as the representation of the first IP address.

15. A computer-readable medium storing a computer program product for storing flow entries in a network data repository comprising a plurality of flow record folders, each flow entry comprising a plurality of keys and at least one measure, the keys comprising a location and a time stamp, the computer-readable medium comprising:

program code for storing a first flow record in a first flow record folder, wherein the first flow record folder comprises a first location index and at least one circular buffer of record tables, and wherein storing the first flow record in the first flow record folder comprises:

responsive to the first location index and the location of a first flow entry, determining a first circular buffer of the first flow record folder;

responsive to a first time unit associated with the time stamp of the first flow entry, determining a first record table of the first circular buffer; and storing the first flow record in the first record table, the first flow record comprising the time stamp of the first flow entry and the at least one measure of the first flow entry;

program code for aggregating the first flow entry and a second flow entry to produce a combined measure, wherein aggregating the first flow entry and a second flow entry comprises:

determining if the location of the first flow entry is the same as the location of the second flow entry;

responsive to determining that the location of the first flow entry is the same as the location of the second flow entry, combining the at least one measure of the first flow entry and the at least one measure of the second flow entry into the combined measure; and determining a second time unit associated with the time stamp of the first flow entry and a time stamp of the second flow entry, the second time unit being different from the first time unit, and the second time unit including the first time unit; and program code for storing a second flow record in a second flow record folder, wherein the second flow record folder comprises a second location index and at least another circular buffer of record tables, and wherein storing the second flow record in the second flow record folder comprises:

responsive to the second location index and the location of the first flow entry, determining a second circular buffer of the second flow record folder;

responsive to the second time unit, determining a second record table of the second circular buffer; and storing the second flow record in the second record table, the second flow record comprising the combined measure.

16. The computer-readable medium of claim 15, wherein the first flow record further comprises the location of the first flow entry.

17. The computer-readable medium of claim 16, wherein the first flow record comprises a 32 bit block ID, said 32 bit block ID comprises the location of the first flow entry and the time stamp of the first flow entry.

18. The computer-readable medium of claim 15, wherein the first flow entry is associated with a first IP address, and wherein the first flow record further comprises a representation of said first IP address.

19. The computer-readable medium of claim 18, wherein the first IP address comprises a client IP address.

20. The computer-readable medium of claim 18, wherein the first IP address comprises a client subnet IP address.

21. The computer-readable medium of claim 18, wherein the first IP address comprises a server IP address.

22. The computer-readable medium of claim 18, wherein storing the first flow record in the first record table comprises:

receiving the first IP address;

subtracting a predetermined number from the first IP address to produce a 32 bit signed integer; and storing the 32 bit signed integer as the representation of the first IP address.

23. The computer-readable medium of claim 15, wherein the second flow record further comprises the location of the first flow entry.

24. The computer-readable medium of claim 23, wherein the first flow record comprises a 32 bit block ID, said 32 bit block ID comprises the location of the first flow entry and the time stamp of the second flow entry.

25. The computer-readable medium of claim 15, wherein the second flow entry is associated with a first IP address, and wherein the second flow record further comprises a representation of said first IP address.

26. The computer-readable medium of claim 25, wherein the first IP address comprises a client subnet IP address.

27. The computer-readable medium of claim 25, wherein the first IP address comprises a server IP address.

28. The computer-readable medium of claim 25, wherein storing the second flow record in the second record table comprises:

receiving the first IP address;

subtracting a predetermined number from the first IP address to produce a 32 bit signed integer; and storing the 32 bit signed integer as the representation of the first IP address.

* * * * *

UNITED STATES PATENT AND TRADEMARK OFFICE
CERTIFICATE OF CORRECTION

PATENT NO. : 7,587,513 B1  
APPLICATION NO. : 11/489915  
DATED : September 8, 2009  
INVENTOR(S) : Maturi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 505 days.

Signed and Sealed this

Twenty-first Day of September, 2010

David J. Kappos  
*Director of the United States Patent and Trademark Office*